(12) United States Patent
Su et al.

(10) Patent No.: US 7,444,646 B2
(45) Date of Patent: Oct. 28, 2008

(54) METHOD OF CREATING DRIVE COMPONENT OBJECT AND REALIZING DEVICE DRIVE PROGRAM MULTIPLICITY ON BASIS OF CATEGORY

(75) Inventors: Yipeng Su, Shanghai (CN); Rong Chen, Shanghai (CN); Yongwen Du, Shanghai (CN); Yuzhou Liang, Shanghai (CN)

(73) Assignee: Koretide (Shanghai) Co., Shanghai (CN)

( * ) Notice: Subject to any disclaimer, the term of this patent is extended or adjusted under 35 U.S.C. 154(b) by 918 days.

(21) Appl. No.: 10/747,058

(22) Filed: Dec. 30, 2003

(65) Prior Publication Data

US 2004/0154026 A1 Aug. 5, 2004

(30) Foreign Application Priority Data

Dec. 31, 2002 (CN) .............................. 02 1 59488

(51) Int. Cl.
*G06F 13/00* (2006.01)
(52) U.S. Cl. ....................... 719/321; 717/106; 717/108; 717/140

(58) Field of Classification Search ................. 719/321, 719/327; 717/168–172
See application file for complete search history.

(56) References Cited

U.S. PATENT DOCUMENTS

| | | | |
|---|---|---|---|
| 6,205,492 B1 * | 3/2001 | Shaw et al. ................. | 719/321 |
| 6,825,941 B1 * | 11/2004 | Nguyen et al. ............. | 358/1.15 |
| 2001/0032268 A1 * | 10/2001 | Brown et al. ................ | 709/230 |

* cited by examiner

*Primary Examiner*—Meng-Ai An
*Assistant Examiner*—Phuong N Hoang
(74) *Attorney, Agent, or Firm*—Rabin & Berdo, P.C.

(57) ABSTRACT

A method of creating drive component object and realizing device drive program multiplicity on basis of category, in which the drive component class is defined and realized at first, then the component customer program creates drive object with category intellectual pointer. In present invention, the operation system selects automatically the corresponding component based on specified component kind by customer specification and realizes further a multi-mode access to drive program from application program. In present invention, certain overheads for efficiency are needed to be added only in the dynamic binding in course of drive object creating; once drive object is created, the operation system would returns the common interface realized by drive object back to the application program and application program may invoke directly the particular drive object method, it has no extra efficiency overhead and realizes a multi-mode access to drive program from application program.

4 Claims, 3 Drawing Sheets

METHOD OF CREATING DRIVE COMPONENT OBJECT AND REALIZING DEVICE DRIVE PROGRAM MULTIPLICITY ON BASIS OF CATEGORY

FIELD OF THE INVENTION

The present invention relates to a method for creating driver component objects and realizing category-based device driver program polymorphism. Especially, it relates to a component creating method in which the operation system selects automatically the corresponding driver component based on the component category specified by clients, enabling a polymorphic access to the driver program from an application program. It is in the computer technology field.

BACKGROUND OF THE INVENTION

In an operation system, a true hardware driver program always executes the I/O access against a certain specified hardware device and provides the application with the access interface of this specified device. However, users of the driver program, in most cases, do not care which device is being utilized. They only care whether a usable device of this type exists in the system. For example, a user such as the application program for a printer only cares whether there is a usable printer, but does not care whether the printer is a parallel one, a serial one, or network one, not to mention the printer type or trademark. In view of this, it is not reasonable for an application program utilizing a printer to specify directly the printer driver program to be used.

To solve this problem, in traditional methods the operation system divides the driver program into layers. Referring to FIG. 1, a printer driver program usually is divided into three layers, i.e. hardware I/O layer 3, print driver layer 2 and application interface layer 1. In application interface layer 1, the operation system realizes a pseudo-print driver program with the aim to provide a standard printer interface for upper layer application programs, so the application programs may utilize it without worrying about the particular printer type. The lower layer print driver program registers itself to the pseudo-driver program of a fictitious printer in installation, and the fictitious printer driver would transfer the print request of upper layer application to the particular print driver program to execute corresponding print order.

This property, which obtains various function characteristics according to the various entity object (driver program) cited by interface through an abstract interface (application interface layer 1), is referred to as polymorphism in the component-oriented (or object-oriented) technology.

The problem of isolation between an application program and a particular hardware could be resolved satisfactorily by the polymorphism characteristic. However, owing to the fact that there is no true component object model (COM) in the core of the traditional operation system to support this characteristic, there are the following two problems in this model, i.e. 1. there is no common utility and a pseudo-driver program of upper layer application-oriented is required for every kind of device; and 2. an interface layer transfer brings about an extra efficiency overhead, and sometimes unnecessary data copy.

In the COM, all the components use the class identification (CLSID) as a unique identifier of driver component class, and each CLSID corresponds to a component realization.

It is considered by COM specification that the binary polymorphism is realized if an abstract interface can be obtained. However, this does not occur in practice. When a component customer terminal utilizes a component, it needs still to specify the CLSID of the component server to create a component object, and specifying the CLSID means specifying the component realization.

Take the above printer model as an example. Suppose that the print driver programs are made up of components and all of the programs have a "common printer interface." If it is required that the application program specifies the CLSID at the time of driver object creation, the kind of print driver program is specified, and thus the device or driver is not transparent to the application program.

So abstracting the interface out merely realizes a polymorphism in invoking the component method, but the polymorphism of component creation is not realized. The utilization of a component unavoidably requires three steps: creating, invoking and withering away. Therefore, the polymorphism in component application may be realized only if realizing the polymorphism of component creation.

BRIEF DESCRIPTION OF THE INVENTION

The basic purpose of present invention is provide a method of creating driver component object and realizing device driver program multiplicity on basis of category, in which the operation system selects automatically the corresponding component based on specified component kind by customer specification and realizes further a polymorphic access to driver program from application program.

The purpose of present invention is realized as follows:

A method of creating driver component object and realizing device driver program multiplicity on basis of category includes at least the following:

Step 1: Define and realize driver component category.

Step 2: The client program of the component creates a driver object based on the driver component category.

The realize method includes further to set up the default class identifier (CLSID) of this category in a driver component category.

The CLSID setup method in said driver component category is: register the driver component category and driver component class belonged to it, and register the last one to the CLSID in driver component category as the default CLSID of this driver component category.

The CLSID setup method in said driver component category may be:

Step 31: Read in the component register information in system component category register file;

Step 32: Read out the metadata of driver component packeted in the corresponding dynamic link library file resource section;

Step 33: Check if new category is defined in metadata of driver component, otherwise execute Step 35;

Step 34: Add the new category information including driver component category identifier into the category registry;

Step 35: Check if the driver component class belonged to the driver component category in category registry exists in metadata, and execute Step 37 if no existing;

Step 36: Add the driver component class information including driver component category identifier to the corresponding driver component category and regard this driver component class as a default driver component class in this category;

Step 37: Wright the revised category registry back to the system category registry file.

The CLSID setup method in said driver component category may be: in case of there are more than 1 driver component class corresponding driver component category in dynamic link library file defining driver component category, the last driver component class belonged to this category is utilized as a default class, otherwise return a failure information.

Said Step 1 includes in particular:

Step 11: Define the driver component class by inheriting the defined driver component category;

Step 12: Realize the driver component class according to component function requirement;

Step 13: Compile component program and register automatically the driver component category.

In which Step 13 includes in particular:

Step 131: Compile the component program and generate dynamic link library file;

Step 132: Register the defined driver component category and driver component class included in category.

In present invention, before defining and realizing driver component class, include further the category of defining driver utilizing the component definition language.

one or more interfaces may be defined for said driver component class.

Said Step 2 includes in particular the following creation steps:

Step 21: Specify the driver component category identifier (CATID) of which the driver object is to be created;

Step 22; Fetch the default class identifier CLSID of this category;

Step 23: Judge if this CLSID belong to driver program category, execute Step 24 if yes, or create the general component object with CLSID and execute Step 26 if not;

Step 24: Create the particular driver object with CLSID;

Step 25: Inquire out the common interface in category from driver object (QueryInterface, a standard method stipulated by COM specification and used for inquiring if it supports the specified interface from component object);

Step 26: Return back the common interface of the category.

The present invention has following advantages:

1) A pseudo-driver need not be realized to act as a common entry for each kind of driver, but all drivers belonging to the same category may realize the common interface so long as the common interface of the driver category is defined.

2) In the present invention, certain overheads in efficiency must be added only in the dynamic binding in the course of creating a driver object; once the driver object is created, the operating system would return the common interface realized by the driver object back to the application program and the application program may invoke directly the particular driver object. No extra efficiency overhead is required, and the invention realizes the polymorphism of a driver program to application programs.

BRIEF DESCRIPTION OF THE APPENDED DRAWINGS

DETAILED DESCRIPTION OF THE INVENTION

Next, a further description will be made as to the present invention with the Figures and concrete embodiment:

For purpose of the present invention, a designed driver component category includes a group of common interfaces. If a certain driver component class is going to belong to this category, it must inherit this category and realize all the interfaces included in this category. The driver component category itself has no realization code, so the driver component category may be called an abstract class or hyper class.

All the driver component classes inheriting the driver component category realize all the interfaces included in the driver component category, and this is the technology base of the driver component category acting as a common entry of all the driver component classes in the category.

Figure 1:
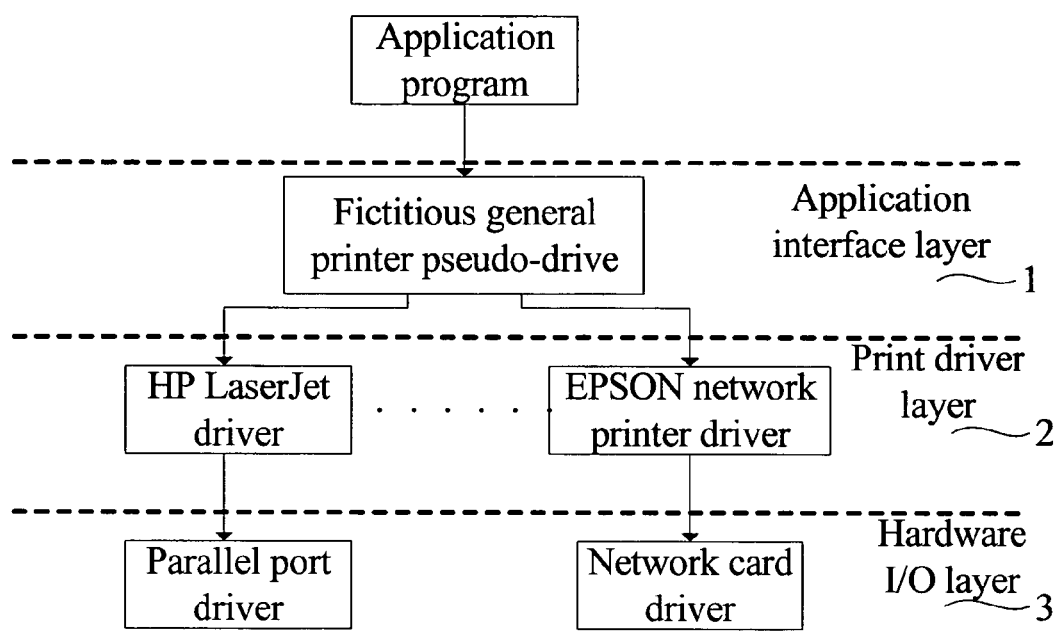
FIG. 1 is an illustrative view showing the traditional driver model.
Figure 2:
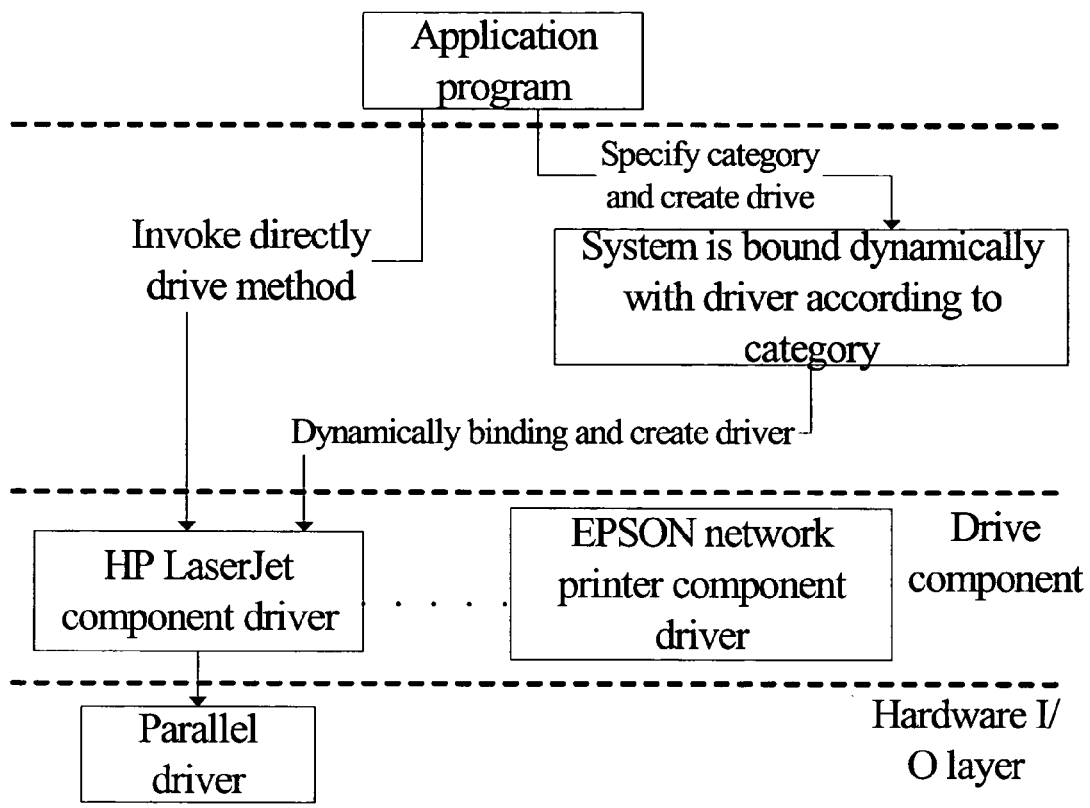
FIG. 2 is an illustrative view showing driver model of driver component category based in the present invention.

Refer to FIG. 2, which is a model illustrative view, taking the print driver as an example and showing that the component-wise driver program is created with a driver component category.

The application program creates the component driving by specifying print driver category. The operation system creates the defaulted print driver in the category for the application program and returns the print driver interface back to the application program. The application program may invoke directly this interface method of print driver object to execute the print operation.

For example, in the application layer, the application program requests the operation system to create a print driver by specifying a printer category, e.g. HP LaserJet (a type of printer).

In this example, the operation system finds out the defaulted component in the category (HP LaserJet in the figure) according to the HP LaserJet category identifier specified by the application program, and creates a driver component object.

If object creating succeeds, the operation system returns directly the common interface back to the application program. In this way, the interfacing method invoked by the application program is one that revokes directly the HP LaserJet driver object, and there is no need for the involvement and transfer of the operation system any more.

Figure 3:
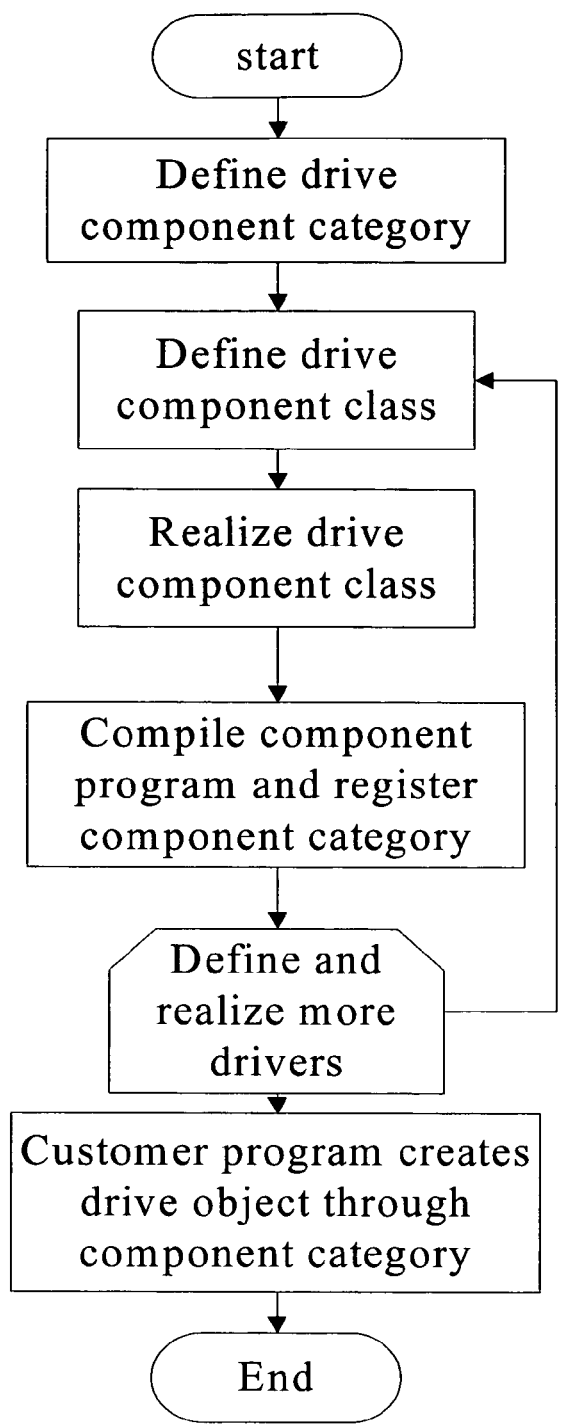
FIG. 3 is a flowchart showing driver program creating based on driver component category in the present invention.

Referring to FIG. 3, the concrete realization method is:

Define the driver category first, for example, the driver category defined with a component definition language in a component definition language (CDL in short) file of a component object model (easy component object Model, ezCOM for short), e.g. define a print driver category titled as "CatPrinter) and describe with particular CDL language as follows:

```
[uuid(02aff0b1-a887-4da7-bf2e-626af6165a56)]
category CatPrinter{
interface Iprinter;
}
``` in which,

[uuid(02aff(b1-a887-4da7-bf2e-626af6165a56)] is the same as the current COM specification and means attribute information of this component;

category CatPrinter defines a printer category CatPrinter;

interface Iprinter defines a printer interface Iprinter.

The print driver category CatPrinter includes a printer interface Iprinter (Refer to the relative COM specification for conception of interface and defining form). In the present invention, one or more interfaces may be defined for a category.

Defining the Driver Component Class

If a certain driver component class is going to belong to the print driver category CatPrinter, it must inherit this print driver category CatPrinter, for example: the defining form of HP LaserJet 6Lprint driver component is described with particular CDL language as below:

```
[uuid(9defd903-6443-4eed-b4e4-a3020b448cb5 ),driver]
class CHPLaserJet6L: CatPrinter{
    interface ILaserJet6L;
}
``` in which,

[uuid(9defd903-6443-4eed-b4e4-a3020b448cb5),driver] is the same as the current COM specification and indicates attribute information of the component;

class CHPLaserJet6L: CatPrinter defines a printer class CHPLaserJet6L, interface ILaserJet6L means: define a printer interface ILaserJet6L.

Here, the definition itself of the class CHPLaserJet6L includes printer interface ILaserJet6L, at the same time it inherits the print driver category CatPrinter and includes also the printer interface IPrinter in the print driver category CatPrinter.

The driver attribute announced before driver component class indicates that the class CHPLaserJet6L is a driver program. So CHPLaserJet6L has to realize another implicit system interface: i.e. driver interface Idriver; this is because the driver program itself is a category also, all the driver component class defined by the driver attribute in the operation system belong to the driver program category CatDriver, and the driver interface IDriver is included in the driver program category CatDriver.

In the embodiment, driver program category CatDriver includes driver interface IDriver. All the driver component classes in the embodiment are inherited from the driver program category CatDriver. Among them, the driver program category CatDriver is defined as below:

```
[uuid(0000112d-0000-0000-C000-000000000066)]
category CatDriver{
    interface IDriver;
}
``` in which,

[uuid(0000112d-0000-0000-C000-000000000066)] is the same as the current COM specification and indicates attribute information of the component;

category CatDriver defines a driver device category CatDriver;

interface Idriver defines a driver device interface Idriver; and the driver device category Idriver includes a driver device interface Idriver. In the present invention, one or more interfaces may be defined for a category.

Realize Driver Component Class

The driver component category and driver component class files are compiled and defined with CDL compiler of ezCOM, and the skeleton of a component source program is created. The skeleton includes all the interfacing methods of the driver component class, and the component realization operator needs to fill the corresponding realization codes according to the component function. Taking Cprinter as a example, all the methods in interfaces of IPrinterr, ILaserJet6L and IDriver must be realized.

Compile the component program and register automatically the driver component category After realizing the code, it needs to compile the component program and generate the dynamic link library file of the component. The driver component category CatPrinter may be added automatically to the category register file "category.cfg", and the class CHP LaserJet69 is added to the category catPrinter and driver component category catDriver.

By repeating the above process, more corresponding driver component classes may be defined and realized.

After the compiling and generation of driver component program, the functions provided by the driver program may be utilized through programming the component customer application program. The client program of the component could create the driver object with the intellectual pointer of category, e.g. creates the following codes of print driver object with category catPrinter described by C++ language:

```
#import<printer.dll>
......
CatPrinterRef catPrinterRef;
hr= catPrinterRef.Instantiate0;
if (FAILED(hr)){
......
}
......
```

Creating the Driver Object by Customer Program

The realization process of creating the driver object with category by driving the client program of the component is as below:

1) Specify the driver component category identifier (CATID) to create the driver object;

2) Fetch the default CLSID of this category;

3) Judge if this CLSID belongs to driver program category (CatDriver);

4) Create the particular driver object with the CLSID;

5) Inquire out the common interface in category from driver object.

6) Return back common interface of the category;

After obtaining the above common interface by the component customer, these functions of common interface may be invoked.

The present invention includes also the setup method of default class identifier (CLSID) in the driver component category and the concrete setup may be any one of the following:

During the time of compiler tool compiling the component program, it could register automatically the driver component category and driver component class belonged to it, and register the last one to the CLSID in the driver component category as the default CLSID of this driver component category.

Register the default class identifier in the driver component category with special tool.

After compiling of dynamic link library (DLL) file which generates component program, the compiler tool would invoke it automatically and register the component.

In the case of no register file, the dynamic link library file defining driver component category may be used. In case of more than one driver component class belonging to the category in the file, the first driver component class belonged to this category is utilized as a default class, otherwise return a failure.

While the present invention has been particularly shown and described with references to preferred embodiments thereof, it is clearly understood that the same is by way of illustration and example only and is not to be taken by way of limitation, it will be understood by those skilled in the art that various variations, alterations, and modifications in form and details may be made therein without departing from the spirit and scope of the invention as defined by the claims and it intended to be encompassed in the scope of the present invention.

We claim:

1. A computer-implemented method for driver component object creation and category-based device driver program polymorphism, comprising:
   defining and realizing a driver component category, including
      setting up a default class identifier for a driver component category,
      compiling a component program and generating a dynamic link library file for the driver component category, and
      registering the driver component category and its driver component class; and
   creating a driver component object based on the driver component category for a client program of the driver component category, so as to realize the category-based device driver program polymorphism.

2. The computer-implemented method of claim 1, wherein said setting up comprises:
   reading driver component category registry information from a system driver component category registry file;
   reading a metadata of a driver component packeted in the resource section of a corresponding dynamic link library file resource section;
   checking whether a new driver component category is defined in the metadata, and if yes, adding information of the new driver component category including a driver component category identifier to the driver component category registry information to obtain revised driver component category registry information;
   checking whether a driver component class exists in the metadata that corresponds to a driver component category in the driver component category registry information, and if yes, adding the driver component class information including a driver component category identifier to the corresponding driver component category and setting this driver component class as the default driver component class in this category;
   if the driver component category registry information is revised, writing the revised driver component category registry information back to the system component category registry file.

3. The computer-implemented method of claim 1, wherein the setting up comprises:
   if more than one driver component class corresponds to the driver component category in a dynamic link library file, utilizing the last driver component class as the default driver component class, and
   if no more than one driver component class corresponds to the driver component category in a dynamic link library file, return a failure information.

4. The computer-implemented method of claim 1, wherein said creating a driver component object based on the driver component category includes the steps of
   specifying a driver component category identifier of the driver component category on which the driver component object is based;
   fetching the default class identifier class identifier of the driver component category;
   judging whether the fetched class identifier belongs to the driver component category, and
      if no, creating a general driver component object with the class identifier, and getting a common interface of the driver component category, or
      if yes, creating a particular driver component object with the class identifier, and querying a common interface of the driver component category from the driver object; and
   returning the common interface of the driver component category.

* * * * *